United States Patent
Gold et al.

(10) Patent No.: US 11,354,307 B2
(45) Date of Patent: Jun. 7, 2022

(54) SYSTEMS AND METHODS FOR MANAGING DATABASES

(71) Applicant: Huawei Technologies Co., Ltd., Shenzhen (CN)

(72) Inventors: Israel Gold, Munich (DE); Hillel Avni, Munich (DE); Antonios Iliopoulos, Munich (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 298 days.

(21) Appl. No.: 15/927,731

(22) Filed: Mar. 21, 2018

(65) Prior Publication Data

US 2018/0268027 A1    Sep. 20, 2018

Related U.S. Application Data

(63) Continuation of application No. PCT/EP2016/065400, filed on Jun. 30, 2016.

(51) Int. Cl.
*G06F 16/903*    (2019.01)
*G06F 16/2453*    (2019.01)
(Continued)

(52) U.S. Cl.
CPC ........ *G06F 16/24532* (2019.01); *G06F 9/466* (2013.01); *G06F 9/5016* (2013.01);
(Continued)

(58) Field of Classification Search
CPC .. G06F 16/24532; G06F 9/466; G06F 9/5016; G06F 16/90339; G06F 16/24552
(Continued)

(56) References Cited

U.S. PATENT DOCUMENTS 6,088,770 A    7/2000  Tarui et al.
6,438,562 B1   8/2002  Gupta et al.
(Continued)

FOREIGN PATENT DOCUMENTS

CN    101802790 A    8/2010
CN    102947807 A    2/2013
(Continued)

OTHER PUBLICATIONS

Zhu et al., "A Survey of Optimization Methods for Transactional Database in Multi-Core Era," Chinese Journal of Computers, vol. 38, No. 9, pp. 1865-1879, with English Abstract, China Computer Federation, Beijing, China (Sep. 2015).
(Continued)

*Primary Examiner* — Vaishali Shah
(74) *Attorney, Agent, or Firm* — Leydig, Voit & Mayer, Ltd.

(57) ABSTRACT

There is provided a database management system, comprising: a multicore processor, a shared memory, a partitioned memory, and a database engine adapted to execute at least one transaction worker thread managing transaction states and database indexes in the shared memory using a cache coherency mechanism, and execute at least one partition manager thread for handling database access actions submitted by the at least one transaction worker thread to access a database in the partitioned memory, the cache coherency mechanism being disabled in the partitioned memory; wherein the at least one transaction worker thread and the at least one partition manager thread are executed simultaneously on the multicore processor.

9 Claims, 10 Drawing Sheets

(51) Int. Cl.
*G06F 16/23* (2019.01)
*G06F 9/46* (2006.01)
*G06F 9/50* (2006.01)
*G06F 16/27* (2019.01)
*G06F 16/2455* (2019.01)

(52) U.S. Cl.
CPC .... *G06F 16/2379* (2019.01); *G06F 16/24552* (2019.01); *G06F 16/278* (2019.01); *G06F 16/90339* (2019.01)

(58) Field of Classification Search
USPC .......................................................... 707/703
See application file for complete search history.

(56) References Cited

U.S. PATENT DOCUMENTS

| | | | | |
|---|---|---|---|---|
| 8,417,889 | B2* | 4/2013 | Flemming | G06F 12/0811 711/122 |
| 2008/0263339 | A1* | 10/2008 | Kriegel | G06F 12/0842 712/228 |
| 2010/0274972 | A1* | 10/2010 | Babayan | G06F 9/3838 711/125 |
| 2012/0011108 | A1 | 1/2012 | Bensberg et al. | |
| 2012/0066474 | A1* | 3/2012 | Funk | G06F 12/1027 711/207 |
| 2014/0188906 | A1* | 7/2014 | Muller | G06F 16/24556 707/752 |
| 2014/0344530 | A1 | 11/2014 | Sayyaparaju et al. | |

FOREIGN PATENT DOCUMENTS

| | | |
|---|---|---|
| CN | 103109279 A | 5/2013 |
| CN | 103299281 A | 9/2013 |
| CN | 104572505 A | 4/2015 |
| CN | 105009111 A | 10/2015 |
| CN | 105190623 A | 12/2015 |
| WO | 0000891 A1 | 1/2000 |
| WO | 0208909 A1 | 1/2002 |

OTHER PUBLICATIONS

"Cache coherence," Wikipedia,the free encyclopedia, XP55346304A, pp. 1-4, (Retrieved Feb. 15, 2017).
Porobic et al., "ATraPos: Adaptive Transaction Processing on Hardware Islands," IEEE International Conference on Data Engineering, Institute of Electrical and Electronics Engineers, New York, New York (2014).
Pandis et al.,"PLP: Page Latch-free Shared-everything OLTP," Proceedings of the VLDB Endowment vol. 4, No. 10, (2011).
Pandis et al.,"Data-Oriented Transaction Execution," VLDB Endowment, ACM, (2010).
Pandis et al., "Scalable Transaction Processing on Multicores [Shore-MT & DORA]," HPTS, Databases @ Carnegie Mellon (Oct. 26, 2009).
Yu et al.,"Staring into the Abyss: An Evaluation of Concurrency Control with One Thousand Cores," Proceedings of the VLDB Endowment, vol. 8, No. 3, (2014).
Stonebraker et al.,"The End of an Architectural Era (It's time for a complete rewrite)," VLDB, Database Group, MIT Computer Science and Artificial Intelligence Lab, (2007).
Diaconu et al.,"Hekaton: SQL Server's Memory-Optimized OLTP Engine," SIGMOD'13, ACM, New York, New York, (Jun. 22-27, 2013).
Tu et al., "Speedy Transactions in Multicore In-Memory Databases," SOSP'13, ACM, (2013).
Anonymous, "xxHash—Extremely fast hash algorithm," generated on https://github.com/Cyan4973/xxHash, (Retrieved Mar. 14, 2018).
Petrovic et al., "Leveraging Hardware Message Passing for Efficient Thread Synchronization", PPoPP'14, ACM, Orlando, Florida, (Feb. 2014).
Wentzlaff et al.,"ON-CHIP Interconnection Architecture of the Tile Processor ",IEEE_Micro. Tilera, Institute of Eleclrical and Electronics Engineers, New York, New York, (2007).

* cited by examiner

SYSTEMS AND METHODS FOR MANAGING DATABASES

CROSS-REFERENCE TO RELATED APPLICATIONS

This application is a continuation of International Application No. PCT/EP2016/065400, filed on Jun. 30, 2016, the disclosure of which is hereby incorporated by reference in its entirety.

BACKGROUND

The present invention, in some embodiments thereof, relates to database management systems (DBMS) and, more specifically, but not exclusively, to systems and methods for managing in-memory databases.

Different systems have been designed to improve the efficiency of retrieving data stored in a database, for example, to execute queries on the stored data. An in-memory database engine is part of a database management system that uses a main memory for storage of a database. The time to access data stored in a database in main memory is faster than the time to access data stored in a database hosted on an external storage device such as a disk.

In multicore processors that include a large number of cores and large memories executing a database engine efficiently is a difficult task. Different methods have been developed to try and utilize the available cores to access the in-memory database.

SUMMARY

It is an object of embodiments of the present invention to provide an apparatus, a system, a computer program product, a method, and a multicore processor for managing in-memory databases.

The foregoing and other objects are achieved by the features of the independent claims. Further implementation forms are apparent from the dependent claims, the description and the figures.

According to a first aspect, a database management system comprises: a multicore processor; a shared memory; a partitioned memory; and a database engine adapted to: execute at least one transaction worker thread managing transaction states and database indexes in the shared memory using a cache coherency mechanism, and execute at least one partition manager thread for handling database access actions submitted by the at least one transaction worker thread to access a database in the partitioned memory, the cache coherency mechanism being disabled in the partitioned memory; wherein the at least one transaction worker thread and the at least one partition manager thread are executed simultaneously on the multicore processor.

The database management system is designed to scale when deployed on multicore processors, optionally multi-core NUMA processors. The multicore processors include a large number of cores, for example, at least 1000 cores. Disabling the cache coherency mechanism for the partitioned memory reduces process power consumption and/or bus contention, which improves overall performance of the database management system. Selectively activating the cache coherency mechanism for the shared memory prevents or reduces the adverse processor performance effects which may occur for large numbers of cores. The implemented selective activation and disabling of the cache coherence mechanism increases the overall number of cores available for use by the database management system, in contrast, for example, with methods that activate the cache coherence mechanism on all cores which limits the number of cores that may be used. For example, cache coherence mechanism activated on all of the thousand cores of a multicore processor severely degrades performance.

In a first possible implementation of the apparatus according to the first aspect, the multicore processor comprises: first processing units operatively coupled to the shared memory and assigned for executing the at least one transaction worker thread, and second processing units each operatively coupled to one of single core cache units and assigned for executing the at least one partition manager thread.

In a second possible implementation of the apparatus according to the first implementation of the first aspect, the database engine is adapted to repartition dynamically dividing independent processing units into the first processing units and the second processing units according to a monitored run time work load of the multicore processor.

The dynamic repartition allows selective enablement and/or disablement of the cache coherence mechanism on respective cores, which may be used to control a tradeoff between computational performance and power consumption. For example, increasing the number of cores with disabled cache coherence mechanism reduces overall power consumption and bus contention, with the tradeoff of increased inter-core messaging.

In a third possible implementation of the apparatus according to the first aspect as such, the at least one partition manager thread comprises partition manager threads; wherein the database engine is adapted to map logical partitions of the database in the partitioned memory; wherein each one of the logical partitions is used by another of the partition manager threads.

The logical partitioning improves computational efficiency of database management system, by accounting for the current state of available partition processing units.

In a fourth possible implementation of the apparatus according to the third implementation of the first aspect, the logical partitions are equal size physical partitions.

In a fifth possible implementation of the apparatus according to the third and/or fourth implementation of the first aspect, the database engine maps the logical partitions according to an output of a hash partitioning mechanism that relates to each one of the logical partitions as comprising rows each having a global hash value at a fixed range.

The hash values uniformly distribute the database rows to partitions, which forces random memory data access, which may reduce or avoid dynamic load balancing and repartition mechanisms, improving computational performance.

In a sixth possible implementation of the apparatus according to the fifth implementation of the first aspect, the global hash value is composed by concatenating a table identifier and a primary key value of a table in which respective the row resides.

According to a second aspect, a method of managing database access actions comprises: executing at least one transaction worker thread managing transaction states and database indexes in a shared memory using a cache coherency mechanism, and executing at least one partition manager thread for handling database access actions submitted by the at least one transaction worker thread to access a database in a partitioned memory, the cache coherency mechanism being disabled in the partitioned memory; wherein the at least one transaction worker thread and the at least one partition manager thread are executed simultaneously on a multicore processor.

According to a third aspect, a multicore processor having independent processing units adapted for executing transaction threads, the independent processing units comprising: first processing units operatively coupled to a shared memory and using a cache coherency mechanism, the first processing units are assigned to handle transaction states and database indexes of the transaction threads; and second processing units each operatively coupled to one of single core cache units and assigned for handling database access actions submitted by the transaction threads to access a database in a partitioned memory, the cache coherency mechanism being disabled in the partitioned memory.

In a first possible implementation of the multicore processor according to the third aspect, the first processing units and the second processing units communicate with one another by inter-core messaging.

In a second possible implementation form of the multicore processor according to the third aspect as such or according to any of the preceding implementation forms of the first aspect, a minimal allocation size for each of the single core cache units is a cache line size.

In a third possible implementation form of the multicore processor according to the third aspect as such or according to any of the preceding implementation forms of the first aspect, the multicore processor is a multicore Non-Uniform Memory Access (NUMA) processor.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DETAILED DESCRIPTION

The present invention, in some embodiments thereof, relates to database management systems (DBMS) and, more specifically, but not exclusively, to systems and methods for managing in-memory databases.

An aspect of some embodiments of the present invention relates to a database management system that includes a multicore processor, optionally a multicore NUMA (non-uniform memory access) processor, used to manage a database. The multicore processor may include a large number of cores, for example, at least 100 cores, or at least 500 cores, or at least 1000 cores. The database management system includes a database engine that executes transaction worker thread(s) and partition manager thread(s) simultaneously. The transaction worker thread(s) manage transactions states and database index(es) in a shared memory that uses a cache coherency mechanism. The partition manager thread (s) handle database access actions submitted by the transaction worker thread(s) to access the database stored in a partitioned memory without using the cache coherency mechanism (e.g., the cache coherency mechanism is disabled in the partitioned memory). As used herein, the terms core and processing unit are used interchangeably.

Optionally, the multicore processor includes a set of cores (processing units) assigned to execute the transaction worker threads and accessing a shared memory. The processing units in the set are referred to herein as shared processing units. Alternatively or additionally, the multicore processor includes another set of processing units referred to herein as partition processing units, are assigned to execute the partition manage thread(s) and access a partition memory. The division and assignment of independent processing units (also referred to herein as cores) of the multicore processor into the shared and partition processing unit sets may be performed dynamically, optionally according to a run time workload of the multicore processor.

The database management system is designed to scale when deployed on multicore processors, optionally multicore NUMA processors. The multicore processors include a large number of cores, for example, at least 1000 cores. Disabling the cache coherency mechanism for the partitioned memory reduces process power consumption and/or bus contention, which improves overall performance of the database management system. Selectively activating the cache coherency mechanism for the shared memory prevents or reduces the adverse processor performance effects which may occur for large numbers of cores. The implemented selective activation and disabling of the cache coherence mechanism increases the overall number of cores available for use by the database management system, in contrast, for example, with methods that activate the cache coherence mechanism on all cores which limits the number of cores that may be used. For example, cache coherence mechanism activated on all of the thousand cores of a multicore processor severely degrades performance.

An aspect of some embodiments of the present invention relates to a method of managing database access actions (e.g., performed on the database management system) by executing transaction worker thread(s) managing transaction states and database index(es) in a shared memory using a cache coherency mechanism simultaneously with execution of partition manager thread(s) that handle database access action(s) submitted by the transaction worker thread(s) to access a database stored in a partitioned memory. The cache coherence mechanism is disabled in the partitioned memory.

An aspect of some embodiments of the present invention relates to a multicore processor (e.g., included in the database management system) that includes independent processing units (i.e., cores) designed for simultaneous execution of transaction threads.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Embodiments of the present invention may be a system, a method, and/or a computer program product. The computer program product may include a computer readable storage medium (or media) having computer readable program instructions thereon for causing a processor to carry out aspects of some embodiments of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

Computer readable program instructions described herein can be downloaded to respective computing/processing devices from a computer readable storage medium or to an external computer or external storage device via a network, for example, the Internet, a local area network, a wide area network and/or a wireless network.

The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
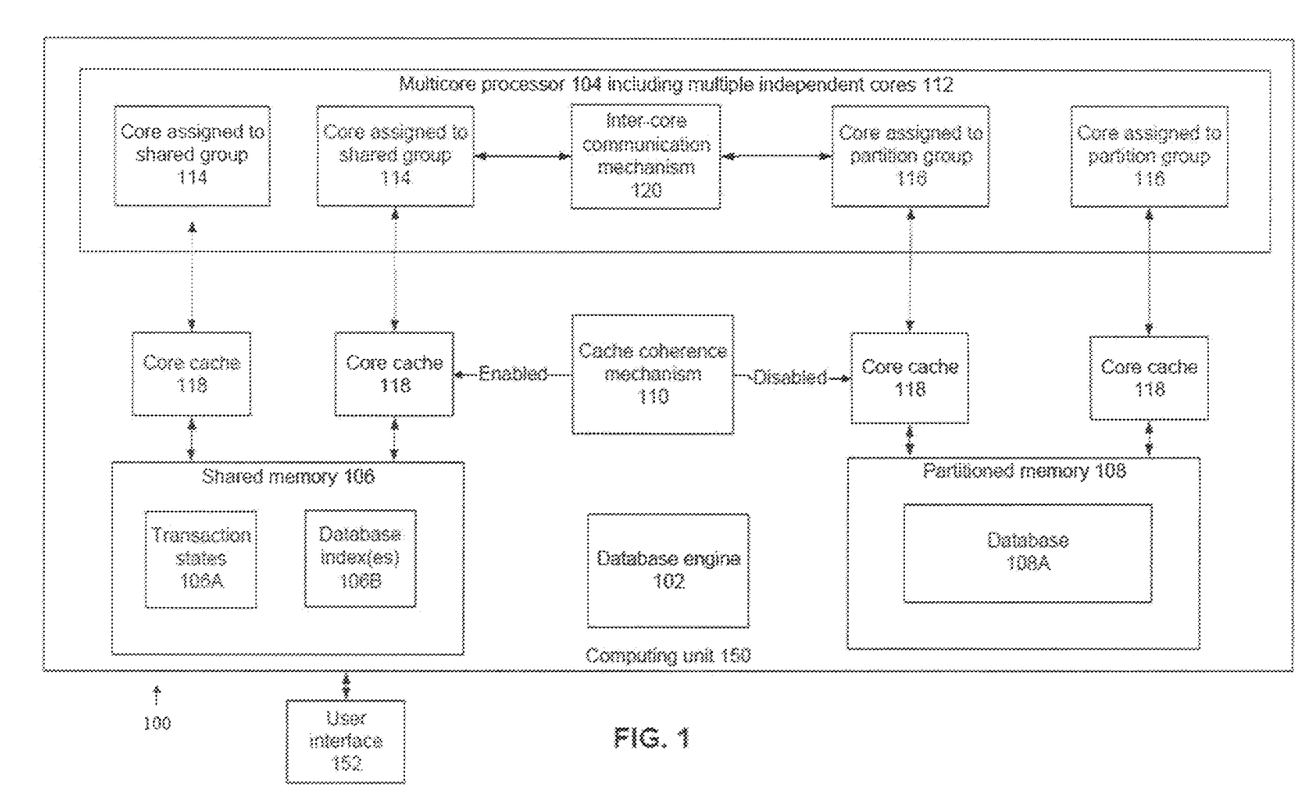
FIG. 1 is a block diagram of a database management system that includes a database engine that simultaneously executes transaction worker thread(s) associated with a shared memory using an activated cache coherency mechanism, and partition manager thread(s) associated with a partitioned memory for which the cache coherence mechanism is disabled, in accordance with some embodiments of the present invention.

Reference is now made to FIG. 1, which is a block diagram of a database management system 100 that includes a database engine 102 that simultaneously executes on a multicore processor 104, transaction worker thread(s) associated accessing a shared memory with an activated cache coherency mechanism, and partition manager thread(s) associated accessing a partitioned memory with a disabled cache coherence mechanism, in accordance with some embodiments of the present invention. Database engine 102 manages database 108A, which may be an in-memory database, using multicore processor 104 which may include a large number of independent processing units (also referred to herein as cores) 112. Database engine 102 improves the efficiency of processing database relates commands (e.g., search, add, delete, query) by improving the ability to use the large number of cores, as described herein. It is noted that as used herein, the term in-memory means a database for which the entire database is located within a fast access time memory.

Database management system 100 provides improved computational efficiency (e.g., in terms of reduced processing time) over a larger number of cores in comparison to other methods, which experience a reduction in computational efficiency as the number of cores grows.

Database engine 102 may be implemented, for example, as code executed by multicore processor, code executed by another processor, and/or in hardware. Instruction for database engine 102 may be stored, for example, in a main memory, on a storage device, or other implementations.

Figure 2:
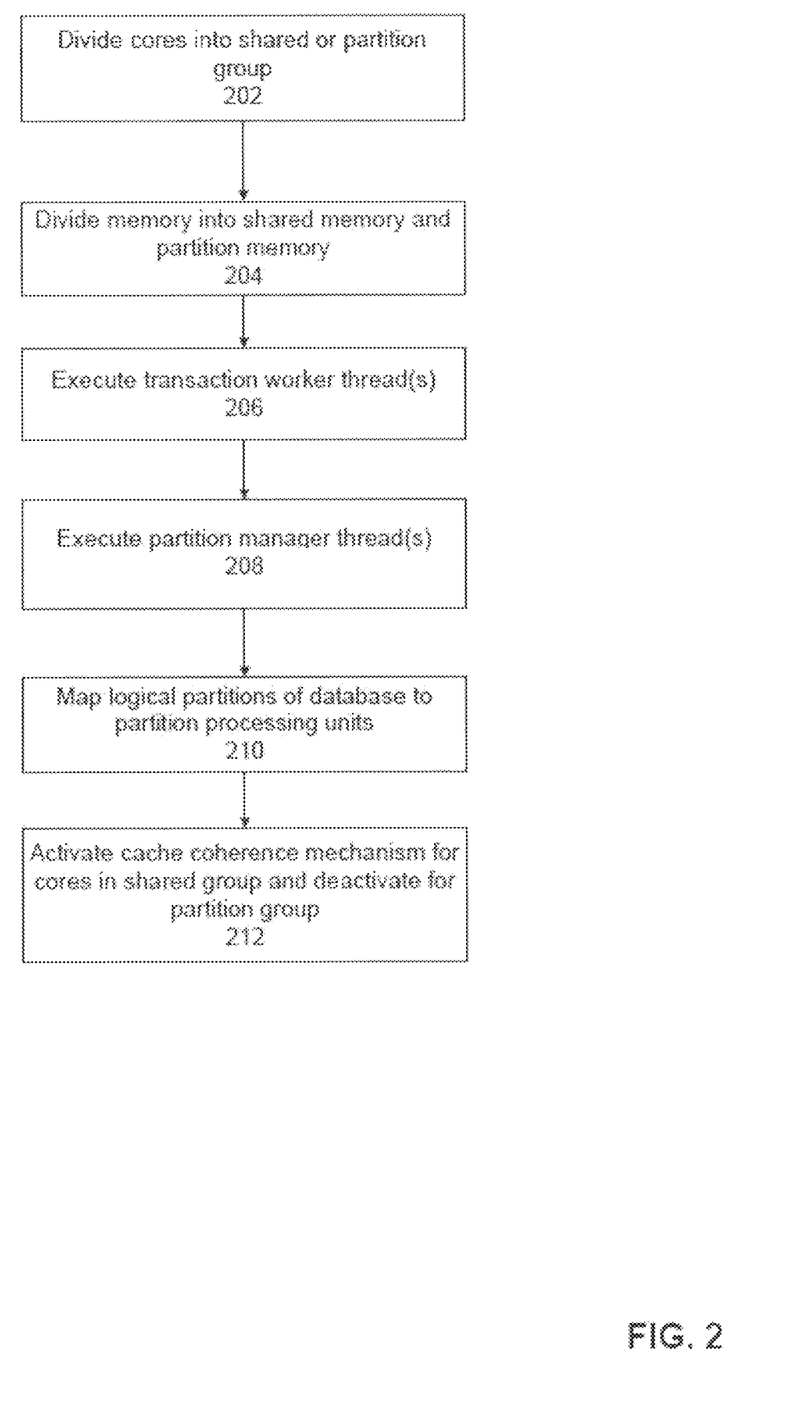
FIG. 2 is a flowchart of a method of managing database access actions by simultaneously executing the transaction worker thread(s) and the partition manager thread(s), in accordance with some embodiments of the present invention.

Reference is now made to FIG. 2, which is a flowchart of a method of managing database access actions by simultaneously executing the transaction worker thread(s) and the partition manager thread(s), in accordance with some embodiments of the present invention. The cores are divided into two groups: shared and partitioned (block 202 of FIG. 2). The memory is divided, optionally into two contiguous address spaces, for shared memory and partition memory (block 204 of FIG. 2). The method of FIG. 2 may be executed by database engine 102 on multicore processor 104 of database management system 100 of FIG. 1.

To help understand the architecture and/or operation of database management system 100, a discussion of symmetric DMBS architectures and partitioned DMBS architectures is provided.

Figure 3:
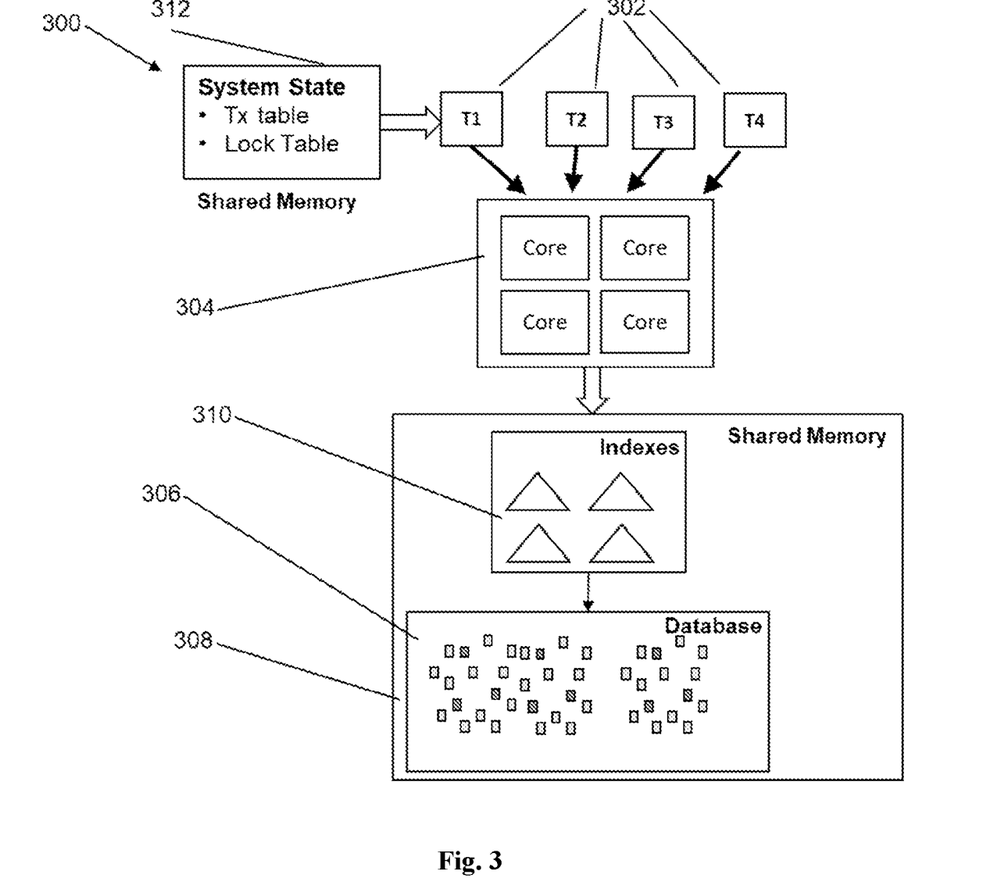
FIG. 3 is a block diagram depicting an example of a symmetric DBMS architecture based on multiple transaction threads each running on a separate core, to help understand some embodiments of the present invention.

Reference is now made to FIG. 3, which is a block diagram depicting an example of a symmetric DBMS architecture 300 based on multiple transaction threads 302 each running on a separate core 304, to help understand some embodiments of the present invention. Each transaction thread 302 is able to access the entire database 306 stored in a shared memory 308. Shared memory 308 is shared by all cores 304. Cache coherency is enabled for all cores 304. Transaction threads 302 cooperatively maintain the state of the database engine, including the database 306, the database indexes 310, and the transaction state table 312. The database engine manages transaction serializability. The multicore processor manages the cache coherency of the cores.

Figure 4:
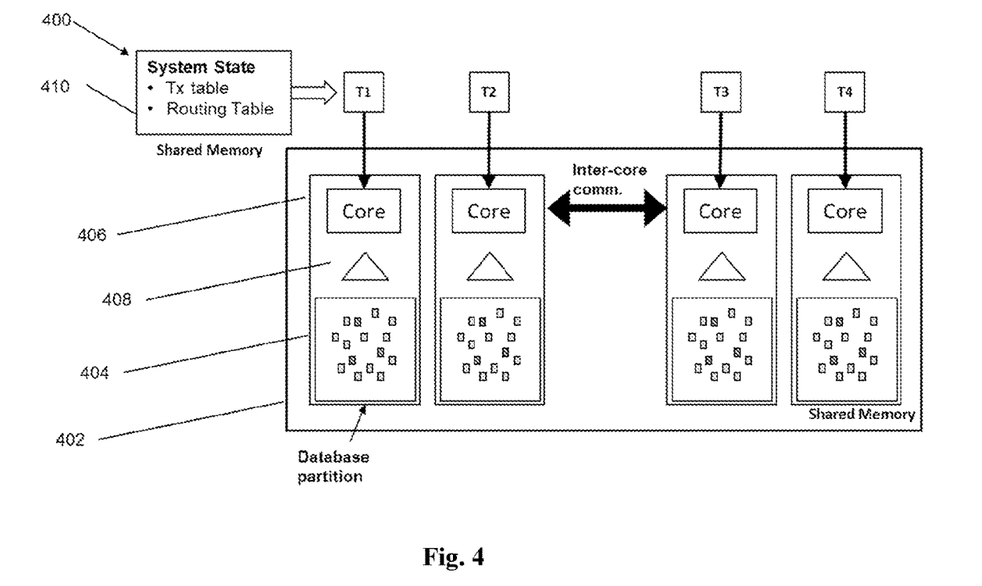
FIG. 4 is a block diagram depicting an example of a partitioned DBMS architecture based on the database being divided into multiple partitions of a shared memory, to help understand some embodiments of the present invention.

Reference is now made to FIG. 4, which is a block diagram depicting an example of a partitioned DBMS architecture 400 based on the database being divided into multiple partitions of a shared memory 402, to help understand some embodiments of the present invention. Each partition 404 is managed by a dedicated core 406. A partition is owner of its respective partition data and respective partition indexes 408. A centralized routing table 410 facilitates routing of transactions to partitions. Multi-partition transactions are executed by migrating transactions between cores. All partitions reside in a shared memory with cache coherency enabled.

The symmetric and partitioned DBMS architectures described with reference to FIG. 3-4 (i.e., in-memory) are limited in the number of cores they can effectively utilize (and therefore do not scale well), since they require cache coherency to be activated across all processor cores. In the symmetric and partitioned DBMS architectures described with reference to FIG. 3-4, the enablement of cache coherency on all cores results in increasing complexity as the number of cores increases, eventually reaching a limit where additional cores do not improve computational efficiency. Additional number of cores may actually reduce the computational efficiency. For example, the symmetric and partitioned DBMS architectures described with reference to FIG. 3-4 cannot reasonably operate with over 1000 cores.

Referring now back to FIG. 1, in contrast, as described herein, the architecture of database management system 100 achieves improved computational efficiency with increasing number of cores. As described herein, the cache coherency mechanism is selectively disabled, which prevents or reduces the complexity associated with enabling the cache coherency mechanism for many cores (as discussed above). Database management system 100 improves multicore scalability, in the presence of non-coherent hardware sockets (i.e., cache coherence mechanisms is disabled for certain cores), as described herein. It is noted that the symmetric and partitioned DBMS architectures described with reference to FIG. 3-4 are inoperable in the presence of non-coherence processor sockets.

Database management system 100 may be implemented within a computing unit 150, for example, a network server, a web server, a computing cloud, a local server, a remote server, a client terminal running code, mobile device, stationary device, server, smartphone, laptop, tablet computer, wearable computing device, glasses computing device, watch computing device, desktop computer, and a kiosk. Computing unit 150 may be implemented as a single computing device, a network of computing devices, a distributed system of interconnected nodes, or other architectures.

Each core 112 (i.e., of a shared group 114 and a partition group 116) is associated with a core cache 118 that is dedicated to the respective core. Core cache 118 may be a single layer or multi-layer cache, for example, including L1, L1 and L2, or higher levels.

When multicore processor 104 includes multiple sockets, each socket having multiple cores 112 (e.g., NUMA processor), cores in shared group 114 and partition group 116 may include one or more sockets.

Database management system 100 includes a shared memory 106 for which a cache coherency mechanism 110 is enabled. Cache coherence mechanism 110 maintains coherency between the core caches 118 of cores of shared group 114 and shared memory 106. Database management system 100 includes a partitioned memory 108 for which cache coherency mechanism 110 is disabled. The cache coherence mechanism 110 is disabled between core caches 118 of cores of partition group 116 and partition memory 108. The cache coherence mechanism may be enabled and disabled per core and/or per socket (optionally by database engine 102), for example, dynamically according to a performance tradeoff and/or multicore processor workload, and/or other factors, for example, as described herein.

The dynamic repartition allows selective enablement and/or disablement of the cache coherence mechanism on respective cores, which may be used to control a tradeoff between computational performance and power consumption. For example, increasing the number of cores with disabled cache coherence mechanism reduces overall power consumption and bus contention, with the tradeoff of increased inter-core messaging.

Optionally, shared memory 106 and/or partitioned memory 108 are implemented in random access memory (RAM), optionally used as a main memory. Database 108A may be stored in RAM, for example, as an in-memory database implementation. Database engine 102 may further improve the performance of the in-memory database.

Optionally, both shared memory 106 and partition memory 108 include a continuous group of memory pages (e.g., continuous physical and/or virtual address spaces). For example, a single (or more) physical memory is divided into two portions, the first designated as shared memory 106, and an adjacent portion designated as partitioned memory 108. The address space of shared memory 106 and partition memory 108 do not overlap.

Multicore processor 104 includes independent processing units 112 (also referred to herein as cores). Each core 112 may execute transaction thread(s) (also referred to herein as transaction worker thread(s)). Each processing unit 112 is assigned (or organized) to a shared processing unit group 114 (also referred to herein as the shared group), or a partition processing unit group 116 (also referred to herein as the partition group). Optionally, when multicore processor 104 is arranged as sockets, with each socket including multiple cores, all cores of each socket are designated into either shared processing units 114 or partition processing units 116. Multicore processor 104 may be implemented as a multicore Non-Uniform Memory Access (NUMA) processor, or a symmetric multiprocessor (SMP). Multicore processor 104 may include non-coherent hardware sockets.

Independent processing units 112 may be homogenous, or heterogeneous. Each independent processing unit 112 may be implemented, for example, as a central processing unit(s) (CPU), a graphics processing unit(s) (GPU), field programmable gate array(s) (FPGA), digital signal processor(s) (DSP), and application specific integrated circuit(s) (ASIC).

Shared processing units 114 are accessing shared memory 106. Shared processing units 114 are assigned to execute transaction worker thread(s) that manage transaction states 106A and database index(es) 106B stored in shared memory 106 using cache coherence mechanism 110. Database indexes 106B may include identifiers that map to one or more entries in the database. For example, keywords that map to documents that include the keywords. The database may be queried by a user by applying the query to the index.

It is noted that partitioned processing units 116 manage data instances stored in database 108A, for example, data entries stored as rows in a table implementation. Partition memory 108 may be partitioned according to pages of the physical memory storing database 108A, or according to the size of cache 118 line of the multicore processor 104. Shared processing units 114 manage database index 106B (stored in shared memory 106) of database 108A.

Database 108A may store data instances. Each data instance may include one or more data entries. The data instances may include text based documents, for example, documents, emails, word processing documents, presentations, spreadsheets, application determined database entries, records, medical records, and portable document format (PDF) files. Data instances may include files, for example, images, music files, other audio files, videos, application defined files, and other data. Data entries may be, for example, words, paragraphs, metadata, pages, and related files.

Cache coherence mechanism 110 (e.g., implemented as code executed by multicore processor 104 and/or implemented as hardware) manages cache coherence, by maintaining consistency between local caches of shared processing units 114 and shared memory 106. Exemplary cache coherence mechanism 110 include: directory-based (data being shared in placed in a common directory that maintains coherence), snooping (each cache monitors address lines of memory locations of the shared memory for which data is locally cached), snarfing (cache controller watches the address space and the data to update its own copy of the memory location). Coherency protocols may be implemented, for example, release consistency model, weak consistency model, sequential consistency model, or other protocols.

Each partition core (processing unit) 116 access the partition memory 108. The partitioned memory 108 is logically divided into logical database partitions, where each logical database partition is managed by a dedicated partition core 116. A given partition core 116 may manage one or more logical database partitions. Each partition core 116 is assigned to execute partition manager thread(s) that handle database access actions submitted by the transaction worker thread(s) to access a database 108A stored in partitioned memory 108. Each partition manager thread manages the logical partition(s) assigned to the respective partition manager thread, for example, data access, lock, and/or vision visibility in the case of multiversion concurrency control (MVCC). The respective partition processing unit 116 may include functions to support an implemented concurrency control mechanism.

A partition manager (e.g., process, not shown) allocates memory for each single code cache unit 118 from partition memory 108. Optionally, a minimal allocation size for each of the single core cache units 118 is a cache line size, or a page of memory. The allocation may be aligned on the cache line boundary so that the same data is not cached by different partition managers. Partition manager may allocate memory from the nearest socket, which may minimize the NUMA effect (e.g., lock starvation under high contention, a local processing unit beating out a remote processing unit).

Each partition processing unit 116 manages logical partitions of database 108A stored in partitioned memory 108. Each partition processing unit 116 may disable cache coherency mechanism 110 for the entire partitioned memory 108.

Shared processing units 114 and partition processing units 116 communicate with one another by inter-core messaging over an inter-core communication mechanism 120. Optionally, inter-core communication mechanism 120 is designed for extremely fast communication.

A user may use a user interface 152 to enter a search query for searching over database 108A, or perform other functions on database 108A such as adding additional rows, adding additional columns, removing rows, removing columns, adding a new data instance, removing an existing data instance, and/or performing other queries and/or operations on the data. The results may be displayed to the user on user interface 210 (or another user interface). Exemplary user interfaces 152 (which may be integrated with a display or other output device, or be implemented as a separate device) include one or more of: a touchscreen, a keyboard, a mouse, and voice activated software operating using speakers and microphone.

Referring back to FIG. 2, at 202, database engine 102 may perform a repartition, by dynamically dividing (and/or re-dividing) cores 112 into the shared processing unit group 114 and the partition processing unit group 116. The division may be performed according to a monitored run time work load of multicore processor 104. For example, multicore processor 104 with two hundred and fifty six cores 112 may be dividing into sixty four shared cores 114 and one hundred ninety two partition cores 116.

The monitored run time workload may include an analysis of the utilization of the independent processing units, and/or utilization of the sockets. The analysis may identify when one or more processing units experience a higher (or lower) performance relative to other processing units, which may suggest a bottle neck that may be improved by the dynamic re-division. Exemplary metrics that may be analyzed include one or more of: utilization rate, throughput, execution time, response time, memory bandwidth, memory latency, and power.

The division may be performed manually by an operator, for example, based on presented results of the run time workload, and/or automatically by code.

At 204, a memory is divided into shared memory 106 and partitioned memory 108. The division may be performed based on the division of the cores. For example, based on the logical division of partition memory 108, to ensure that each portioned portion of partitioned memory 108 corresponds to the size of cache 118 of the cores assigned to partition group 116.

At 206, transaction worker thread(s) managing transaction states and database indexes (stored in shared memory 106) are executed. Each core 114 in the shared group may execute a single transaction worker thread.

The transaction worker thread(s) may be associated with a user entered query or database actions (e.g., entered using user interface 152), and/or associated with an automated processes performing actions on the database, for example, a search, operations on data instances, adding and/or deletion of data instances or other database related operations. Cache coherency mechanism 110 is enabled for shared memory 106.

At 208, partition manager thread(s) for handling the database access actions submitted by the transaction worker thread(s) to access database 108A stored in partitioned memory 108 are executed. Each core 116 in the partition group may execute a single partition worker thread.

Cache coherency mechanism 110 is disabled for partitioned memory 108. For example, when a search query (e.g., user entered query, for example, key words to search for document(s) stored in the database) identifies a match between the database index and data stored in the database (e.g., one or more documents are found that include the key words), the partition manager thread(s) may access the data instances in the database (e.g., retrieve the document(s)) according to a mapping between the index and the database.

The acts described with reference to blocks 206 and 208 are executed simultaneously on multicore processor 104, for example, the index search and database access actions are performed in parallel (e.g. associated with a common query, or with different queries). The simultaneous execution improves utilization of the cores. Alternatively or additionally, the acts of block 206 and 208 may be executed sequentially, optionally for each query and in parallel for different queries, for example, the transaction worker threads first search the index and then the partition manager threads access the data.

At 210, database engine 102 may map logical partitions of database 108A (stored in partitioned memory 108). The logical partitions may be mapped to partition processing units 116. Each partition manager threads may be assigned a unique ID to facilitate the mapping of a logical database partition to partition manager thread (i.e., to a respective core 116 in the shared group). Partitioned memory 108 may be accessed concurrently by partition group cores 116, for example, by all the cores in the partition group. In some implementations, database 108A is logically partitioned into N logical database partitions, where N denotes the number of cores 116 in the partition group. Other division architectures are possible.

The logical partitioning improves computational efficiency of database management system 100, by accounting for the current state of available partition processing units 116. The logical partitioning may be re-performed, or updated, trigged by the division (or re-division) of cores 112. For example, the dynamic division may result in a large amount of available partition processing units 116, or fewer available partition processing units 116 in comparison to the previous division. Existing logical partitions may map to non-existent partition processing units 116 (which have been re-assigned to shared processing units 114), or additional available partition processing units 116 may be available for mapping. The logical partitioning is based on the updated available partition processing units 116.

Each of the logical partitions is used by another of the partition manager threads, optionally of the respective mapped partition processing unit 116. Optionally, the logical partitions are equal size physical partitions. Optionally, each database partition is mapped to a single partition processing unit 116. The partitions and/or mapping may be stored, for example, in a partition map table that is maintained and/or managed by database engine 102.

Transaction worker threads may communicate with the partition manager access table data. The partition map table may be consulted to access the partition manager on the mapped partition processing unit 116.

Optionally, database engine 102 maps the logical partitions according to an output of a hash partitioning mechanism that relates to each one of the logical partitions as rows, each having a global hash value at a fixed range. The hash partitioning mechanism maps the logical partitions of the database to partition processing units.

The global hash value is composed by concatenating a table identifier and a primary key value of a table in which the respective row resides. Exemplary hash functions include cyclic redundancy check (e.g., CRC64), XXHash (available at http://wwwdotxxhashdotcom/).

It is noted that other mapping mechanisms may be used. The term hash partitioning mechanism is to be understood as an exemplary implementation that is not necessarily limited to hash based methods. As used herein, the term hash partitioning mechanism includes a method for mapping data of an arbitrary size (e.g., the database) to data of a fixed size (e.g., the number of partitioning processing units being used).

The hash values uniformly distribute the database rows to partitions, which forces random memory data access, which may reduce or avoid dynamic load balancing and repartition mechanisms, improving computational performance.

In some implementations, where dataset 108A is represented as a table, the rows of the database are scattered across the portioned memory. Rows with a common hash value form a logical database partition. Each logical database partition may be assigned to a single partition manager. A certain partition manager may manage one or more logical database partitions.

At 212, cache coherency mechanism 110 is enabled for cores 114 of the shared group and/or for shared memory 106, and disabled for cores 116 of the partition group and/or for partitioned memory 108, as described herein. It is noted that block 206 may be executed simultaneously and/or in parallel with blocks 202 and/or 210, for example, as part of the process of dividing the cores into the shared and partition groups.

Figure 5:
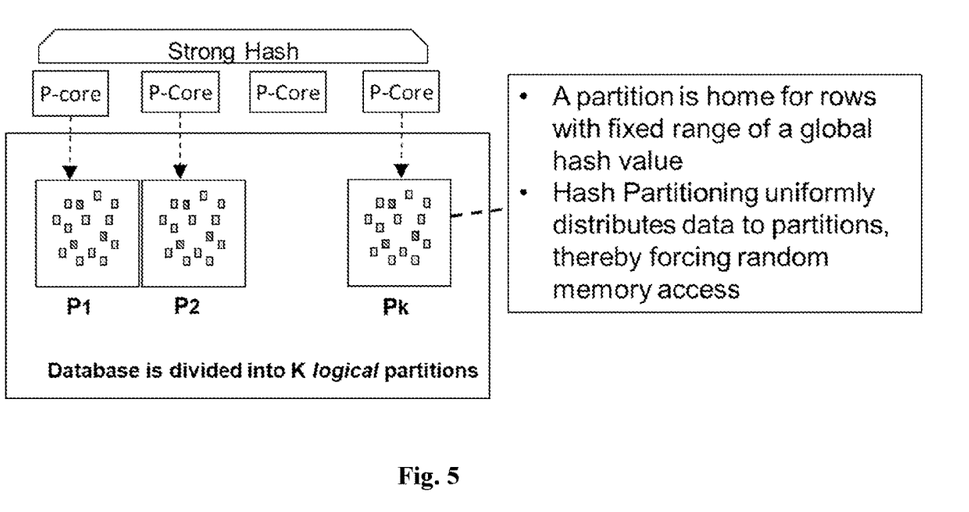
FIG. 5 is a schematic depicting a hash mechanism that maps partition processing units to logical partitions of the database stored in the partitioned memory, in accordance with some embodiments of the present invention.

Reference is now made to FIG. 5, which is a schematic depicting a hash 502 mechanism that maps partition processing units 504 to logical partitions 506 of the database stored in the partitioned memory, in accordance with some embodiments of the present invention.

Figure 6:
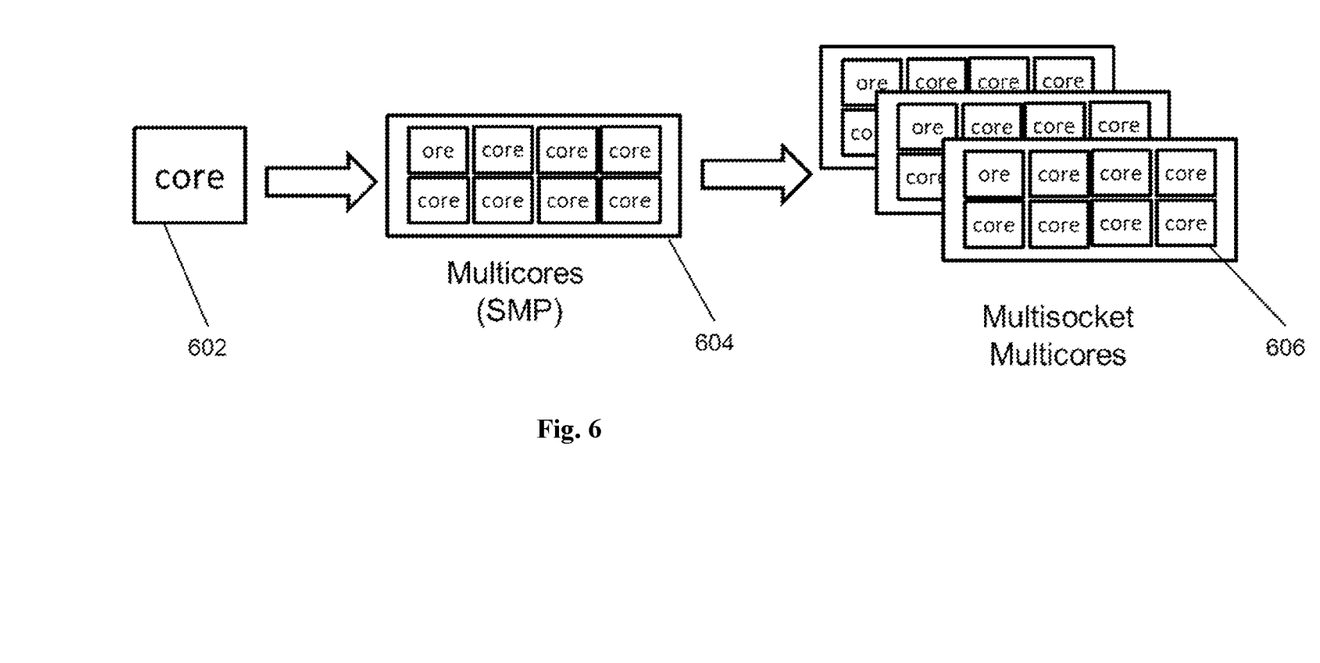
FIG. 6 is a schematic to help understand the scalability of processing architectures, in accordance with some embodiments of the present invention.

Reference is now made to FIG. 6, which is a schematic to help understand the scalability of processing architectures, in accordance with some embodiments of the present invention. A single core 602 may be included as a component within a multicore architecture 604, for example, a symmetric multiprocessing system (SMP). A NUMA architecture 606 includes multisocket multicores (i.e., a collection of cores with a direct pipe to memory). Sockets may also be referred to as hardware islands, or dies.

Figure 7:
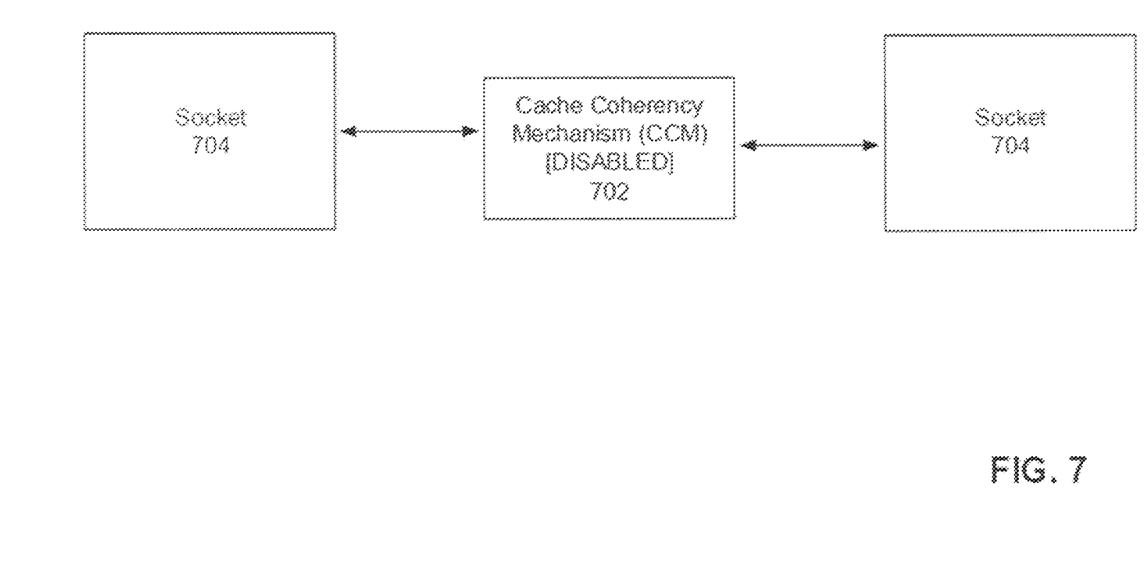
FIG. 7 is a schematic depicting the database management system designed to scale in a multicore multisocket architecture by partial disablement of the cache coherence mechanism, in accordance with some embodiments of the present invention.

Reference is now made to FIG. 7, which is a schematic depicting the database management system designed to scale in a multicore (i.e., large number of cores) multisocket architecture by partial disablement of the cache coherence mechanism 702, in particular, the cache coherency mechanism 702 is depicted as being disabled between sockets 704, in accordance with some embodiments of the present invention.

Figure 8:
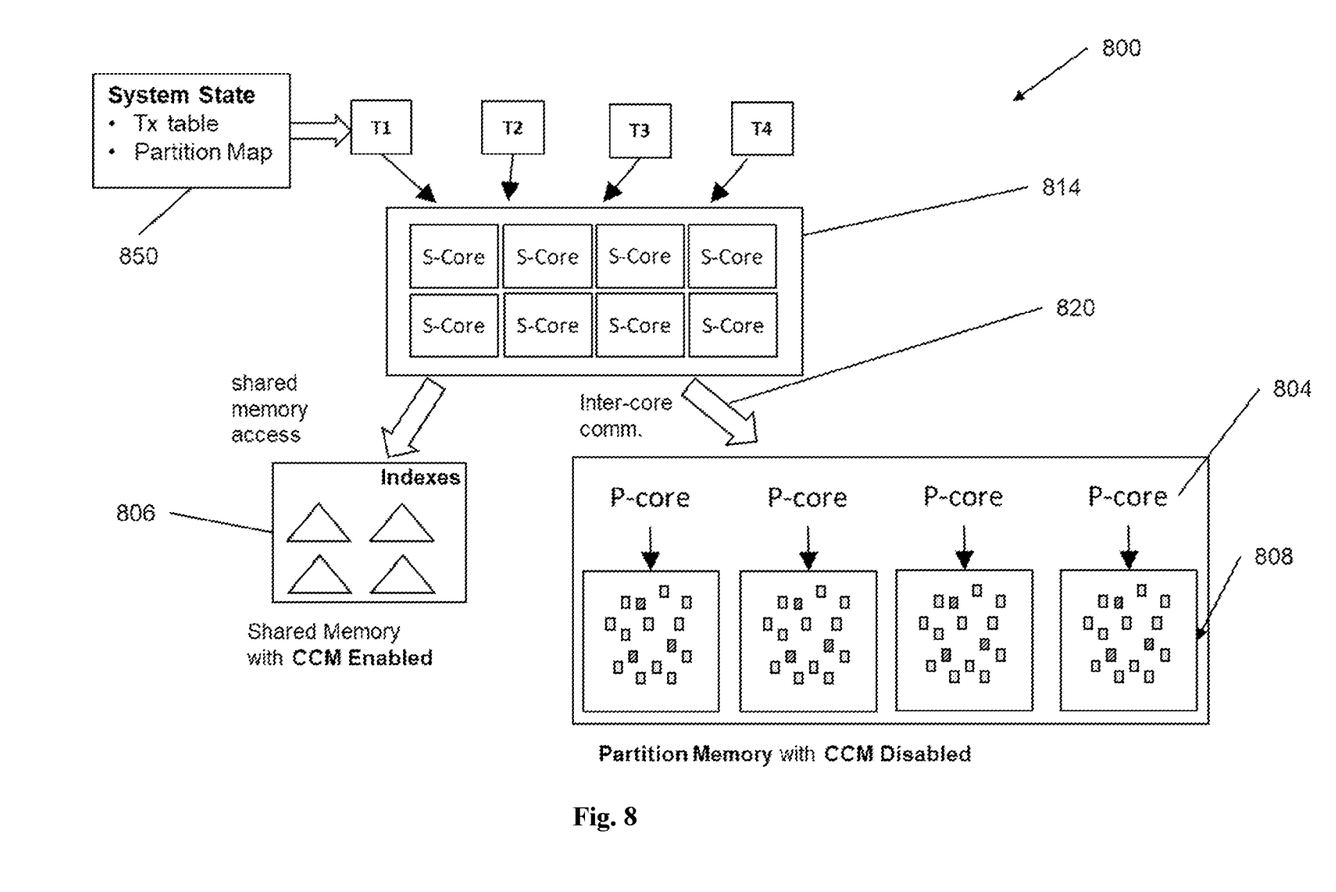
FIG. 8 is another schematic representation of the database management system, in accordance with some embodiments of the present invention.

Reference is now made to FIG. 8, which is another schematic representation 800 of the database management system (e.g., system 100 of FIG. 1), in accordance with some embodiments of the present invention. Representation 800 depicts shared processing units 814 associated with a shared memory 806, and partition processing units 804 each associated with partition of a partitioned memory 808 that store the database, as described herein. Shared processing units 814 communicate with partition processing units 804 using inter-core communication mechanism 820 to execute transactions to access the data in the database. A partition map 850 stores the partitions and/or mapping between the memory partitions 808 and partition processing units 804.

Figure 9:
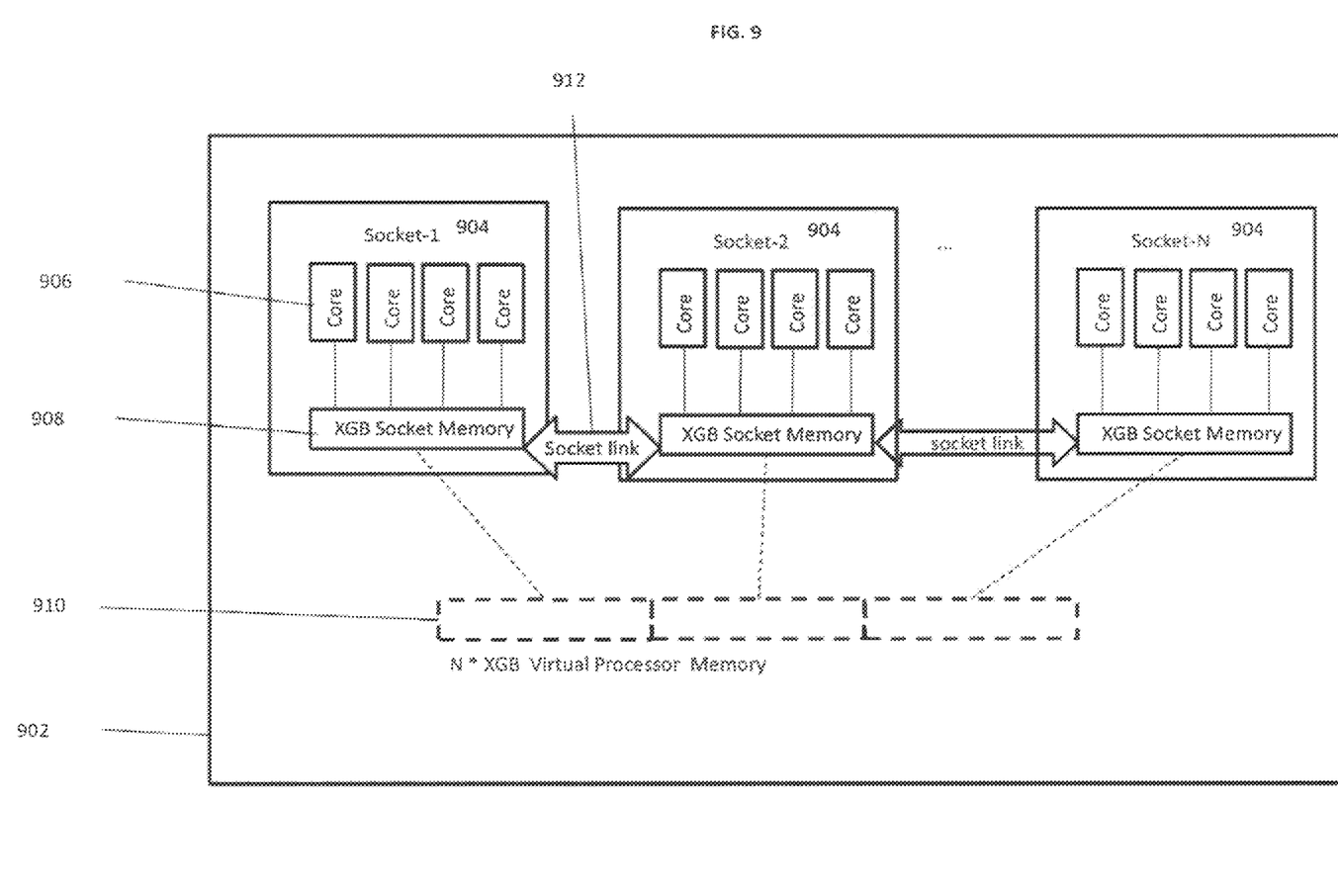
FIG. 9 is a schematic depicting implementation of database management system using a NUMA processing architecture implementation, in accordance with some embodiments of the present invention.
Figure 10:
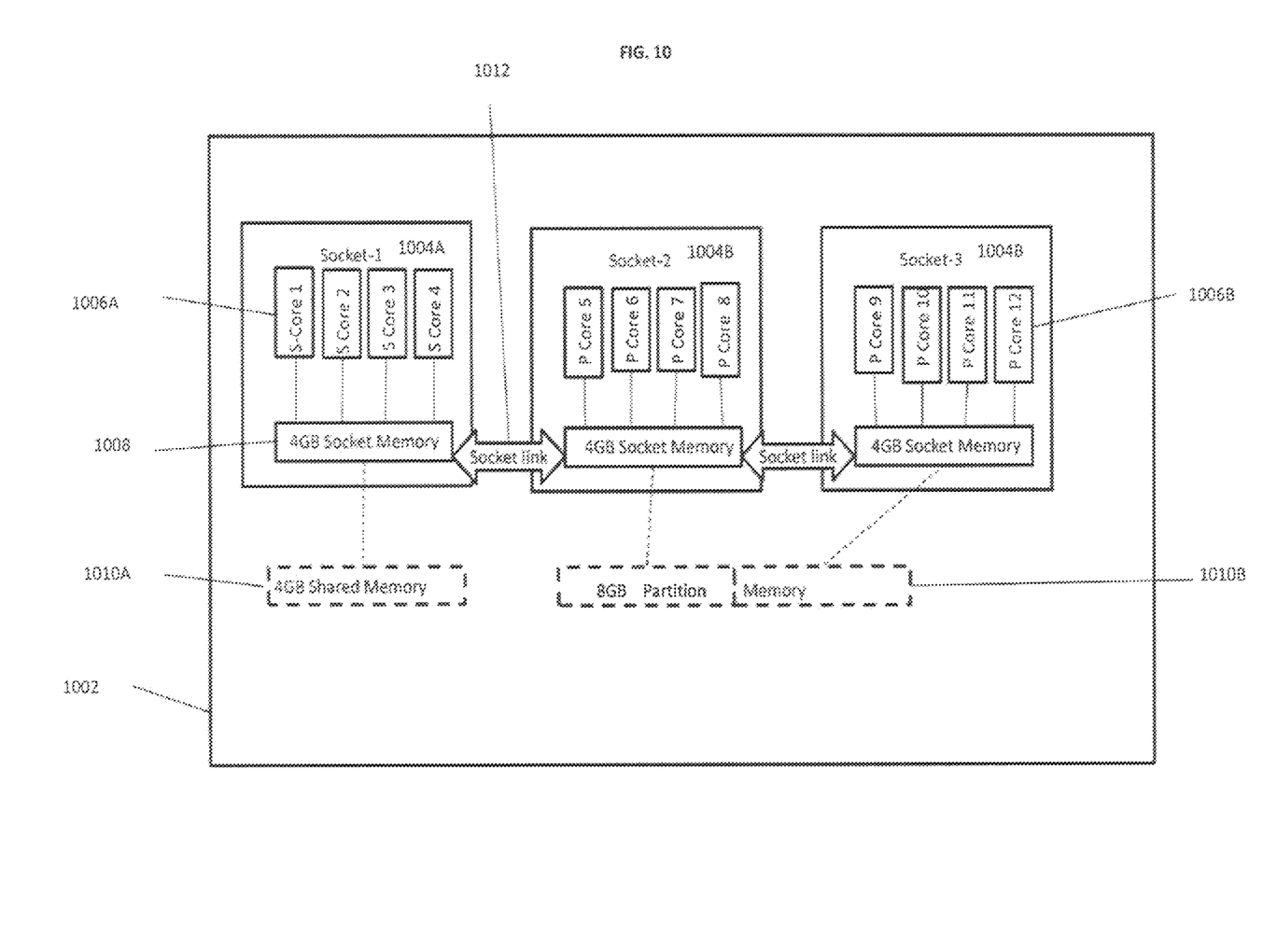
FIG. 10 is an example schematic depicting implementation of database management system using a NUMA processing architecture implementation, in accordance with some embodiments of the present invention.

Reference is now made to FIG. 9-10, which are schematics depicting implementation of database management system 100 in using a NUMA processing architecture implementation of multiprocessor 104, in accordance with some embodiments of the present invention. FIG. 9 depicts an exemplary NUMA processor architecture 902 prior to implementation of database engine 102 described herein (i.e., prior to inclusion within database management system 100 as described herein). NUMA processor 902 includes an arbitrary (i.e. N) number of sockets 904. Each socket 904 includes multiple processing units (i.e., cores) 906. Four cores 906 per socket 904 are shown as an example implementation (more or less cores may be included). Each socket 904 includes a socket memory 908 (of arbitrary size X gigabytes (GB)) used by cores 906 of the respective socket. Sockets 904 may use virtual processor memory 910, which may have a size based on the combined size of socket memories 908 (i.e. N*X GB). Sockets communicate with each other using socket link 912.

FIG. 10 depicts NUMA processor 1002 (based on NUMA processor 902 of FIG. 9) implemented for use by database engine 102 as part of database management system 100, as described herein. NUMA processor 1002 includes shared processing units (i.e., S-cores) 1006A organized within a socket 1004A, and partition processing units (i.e., P-cores) 1006B organized within a socket 1004B, optionally divided as described herein. Each socket 1004A-B includes a respective socket memory 1008, for example, of size 4 GB. S-cores 1006A access shared memory 1010A, as described herein. Shared memory 1010A may have a size based on socket memory 1008 of socket 1004A. P-cores 1006B access partition memory 1010B, as described herein. Partition memory 1010B may have a size based on the combined socket memories 1008 of sockets 1004B (8 GB from two 4 GB memories).

Figure 11:
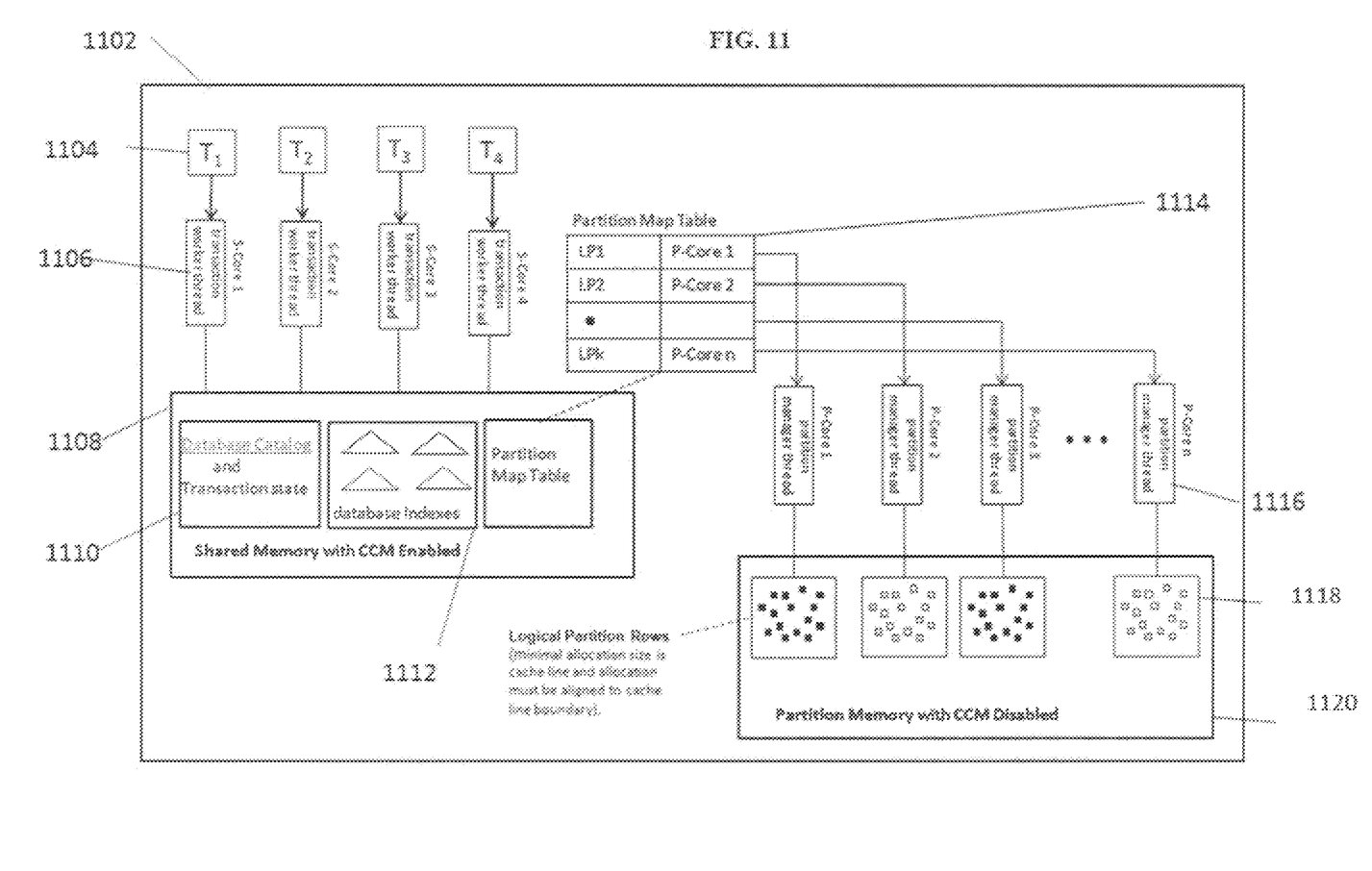
FIG. 11 is a dataflow diagram depicting logical communication between components of database management system, in accordance with some embodiments of the present invention.

Reference is now made to FIG. 11, which is a dataflow diagram 1102 (e.g., a software perspective) depicting logical communication between components of database management system (e.g., 100 of FIG. 1), in accordance with some embodiments of the present invention. Transaction worker threads 1104 are executed by respective shared processing units 1106 (S-cores) to manage transaction states 1110 and database indexes 1112 stored in shared memory 1108. Cache coherency mechanism is enabled for shared memory 1108.

A partition map table 1114 maps logical partitions (i.e., LP) of the database to partition processing units (i.e., P-Cores). Partition manager threads 1116 are executed by respective P-cores to access the respective portion of database 1118 stored in partition memory 1120. Cache coherence mechanism is disabled for partition memory 1120.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant databases and multicore processors will be developed and the scope of the terms database and multicore processor are intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting. Additionally, statements made herein characterizing the invention refer to an embodiment of the invention and not necessarily all embodiments.

What is claimed is:

1. A database management system, comprising:
    a multicore processor comprising a set of shared cores and a set of partition cores;
    a memory; and
    a database engine configured to:
        divide the memory into a shared memory and a partitioned memory corresponding to two contiguous address spaces, wherein the shared memory is shared by the set of shared cores, and the partitioned memory comprises a plurality of logical database partitions, wherein each logical database partition of the partitioned memory is managed by a respective partition core of the set of partition cores that is mapped to the respective logical database partition;
        selectively activate a cache coherency mechanism for the shared memory, wherein the cache coherency mechanism maintains coherency between core caches of the set of shared cores and the shared memory, and disable the cache coherency mechanism for the partitioned memory, wherein the cache coherency mechanism is disabled between core caches of the partition cores of the set of partition cores and the partitioned memory;
        execute, based on the set of shared cores, at least one transaction worker thread for managing transaction states and database indexes in the shared memory based on the cache coherency mechanism; and
        execute, based on at least one partition core of the set of partition cores, at least one partition manager thread for handling a plurality of database access actions submitted by the at least one transaction worker thread to access a database in the partitioned memory,
        wherein the at least one transaction worker thread and the at least one partition manager thread are executed simultaneously on the multicore processor.

2. The system of claim 1, wherein the database engine is further configured to dynamically divide a plurality of independent processing cores of the multicore processor into the set of shared cores and the set of partition cores according to a monitored run time work load of the multicore processor.

3. The system of claim 1, wherein the at least one partition manager thread comprises a plurality of partition manager threads, and wherein each one of the plurality of logical database partitions corresponds to a respective partition manager thread of the plurality of partition manager threads.

4. The system of claim 3, wherein the plurality of logical database partitions are equal size physical partitions.

5. The system of claim 3, wherein the database engine is further configured to map the plurality of logical database partitions according to an output of a hash partitioning mechanism that relates to each one of the plurality of logical database partitions as comprising a plurality of rows each having a global hash value at a fixed range.

6. The system of claim 5, wherein the global hash value for a respective row of the plurality of rows is composed by concatenating a table identifier and a primary key value of a table in which the respective row resides.

7. A method of managing database access actions, comprising:
    dividing, by a database engine of a database management system, a memory of the database management system into a shared memory and a partitioned memory corresponding to two contiguous address spaces, wherein the shared memory is shared by a set of shared cores of a multicore processor of the database management system, and the partitioned memory comprises a plurality of logical database partitions, wherein each logical database partition of the partitioned memory is managed by a respective partition core of a set of partition cores of the multicore processor that is mapped to the respective logical database partition;
    selectively activating, by the database engine, a cache coherency mechanism for the shared memory, wherein the cache coherency mechanism maintains coherency between core caches of the set of shared cores and the shared memory, and disabling the cache coherency mechanism for the partitioned memory, wherein the cache coherency mechanism is disabled between core caches of the partition cores of the set of partition cores and the partitioned memory;
    executing, by the database engine, based on the set of shared cores, at least one transaction worker thread for managing transaction states and database indexes in the shared memory based on the cache coherency mechanism; and
    executing, by the database engine, based on at least one partition core of the set of partition cores, at least one partition manager thread for handling a plurality of database access actions submitted by the at least one transaction worker thread to access a database in the partitioned memory,
    wherein the at least one transaction worker thread and the at least one partition manager thread are executed simultaneously on the multicore processor of the database management system.

8. The database management system according to claim 1, wherein the memory is a random access memory (RAM) of the database management system.

9. The database management system according to claim 8, wherein the RAM is used as a main memory of the database management system.

* * * * *